(12) United States Patent
Lyon et al.

(10) Patent No.: US 7,873,723 B2
(45) Date of Patent: Jan. 18, 2011

(54) DEVICE DATA

(75) Inventors: Geoff M. Lyon, Menlo Park, CA (US); Salil Pradhan, Santa Clara, CA (US); Chandrakant Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2592 days.

(21) Appl. No.: 10/354,109

(22) Filed: Jan. 30, 2003

(65) Prior Publication Data

US 2004/0153539 A1 Aug. 5, 2004

(51) Int. Cl.
*G06F 15/173* (2006.01)

(52) U.S. Cl. ........................ 709/224; 709/223; 709/238; 709/250; 710/1; 710/14; 710/36; 710/38; 710/8; 713/176; 713/185; 713/186; 713/179; 713/193; 235/492; 235/487; 235/379

(58) Field of Classification Search ......... 709/223–225, 709/250; 711/120, 144, 145; 714/21, 54, 714/53; 340/10.31
See application file for complete search history.

(56) References Cited

U.S. PATENT DOCUMENTS

| | | | |
|---|---|---|---|
| 5,790,795 A * | 8/1998 | Hough | 725/116 |
| 6,119,941 A * | 9/2000 | Katsandres et al. | 235/462.07 |
| 6,633,821 B2 * | 10/2003 | Jackson et al. | 702/56 |
| 6,681,299 B1 * | 1/2004 | Shimamura et al. | 711/145 |
| 6,792,507 B2 * | 9/2004 | Chiou et al. | 711/119 |
| 6,985,819 B2 * | 1/2006 | Lipscomb et al. | 702/57 |
| 7,010,647 B1 * | 3/2006 | Karamchetty et al. | 711/115 |
| 2002/0175805 A9 * | 11/2002 | Armstrong et al. | 340/10.31 |
| 2003/0175805 A1 * | 9/2003 | Ducker | 435/7.1 |

* cited by examiner

*Primary Examiner*—Jude J Jean Gilles

(57) ABSTRACT

An apparatus includes a processor and a storage medium. The processor is operable to collect device data associated with the apparatus and transmit at least some of the device data to a tag.

35 Claims, 9 Drawing Sheets

US 7,873,723 B2

DEVICE DATA

FIELD OF THE INVENTION

The invention pertains to collecting data associated with an electronic device. More particularly, this invention relates to transmitting the collected data to a tag.

BACKGROUND OF THE INVENTION

Various systems use transponders to identify objects from a distance by associating a transponder with the object. The transponders, also known as radio frequency identification (RFID) tags, are typically programmed with unique identification codes that identify the object. FIG. 7 illustrates a conventional tag and reader system. A reader 710 may include an inductive element 712 generating a magnetic field that energizes a tag 720. The tag 720 may include an inductive element 722 and a load 724. When the tag 720 is in proximity of the reader 710, the magnetic field generated by the reader 710 energizes the tag 720 by inducing a voltage across the inductive element 722.

The tag 720 may transmit limited information back to the reader 710, such as an identification code. For example, the load 724 shunted across the inductive element 722 when the tag 720 is energized causes the magnetic coupling between the reader 710 and the tag 720 to change. The change in the magnetic coupling results in voltage fluctuations across the inductive element 712 of the reader 710, which when demodulated identifies the information exchanged between the tag 720 and the reader 710.

Readers and tags, such as shown in FIG. 7, are used for a number of applications. However, these applications are usually limited to remote identification applications. Furthermore, in these applications only limited information (e.g., identification number) is typically transmitted from the tag.

SUMMARY OF THE INVENTION

According to an embodiment of the invention, an apparatus comprises a processor operable to collect device data associated with the apparatus; and a storage medium connected to the processor and operable to store the device data, wherein the processor transmits at least some of the device data to a tag.

According to another embodiment of the invention, a system comprises an electronic device connected to a network; and a tag connected to the electronic device, wherein the electronic device is operable to write data to the tag in response to detecting a condition of the electronic device.

According to yet another embodiment of the invention, a method comprises storing data associated with an electronic device; detecting an update of the data; and transmitting the data from the electronic device to a tag in response to detecting the update.

According to yet another embodiment of the invention, an apparatus comprises means for storing data associated with an electronic device; means for detecting an update of the data; and means for transmitting the data from the electronic device to a tag means.

According to yet another embodiment; a system comprises a plurality of electronic devices connected to a network; a tag connected to each electronic device, wherein each electronic device is operable to transmit data associated with the electronic device to the tag; and network management software for the network, wherein the network management software is operable to display the data.

According to yet another embodiment; a system comprises at least one electronic device housed in a rack; tag connected to the electronic device, wherein the electronic device is operable to transmit data associated with the electronic device to the tag; and at least one reader operable to receive the data associated with the electronic device from the tag. The system further comprises a computing device connected to the at least one reader, wherein the computing device is operable to determine location of the electronic device based on detecting a presence of the electronic device in the rack.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE EMBODIMENTS

In the following detailed description, numerous specific details are set forth in order to provide a thorough understanding of the present invention. However, it will be apparent to one of ordinary skill in the art that these specific details need not be used to practice the present invention. In other instances, well-known structures, interfaces, and processes have not been shown in detail in order not to unnecessarily obscure the present invention.

Figure 1:
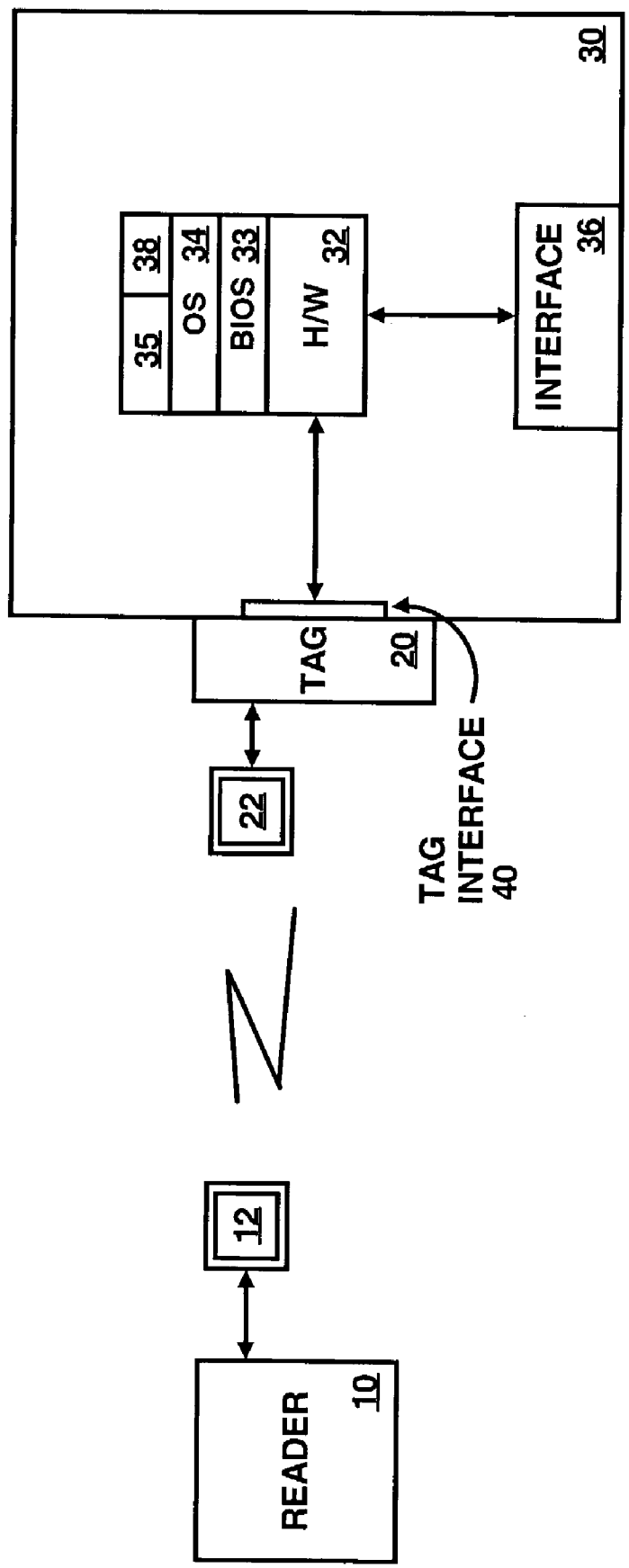
FIG. 1 illustrates a block diagram of a system, according to an embodiment of the invention.

FIG. 1 illustrates a system 100 including a reader 10 (also known as an interrogator) and a tag 20 (also known as a transponder) connected to an electronic device 30, according to an embodiment of the invention. In one embodiment, the tag 20 may include a passive tag (i.e., not using an internal power source such as a battery). The reader 10 generates a magnetic field for interrogating a tag (e.g., the tag 20) using an antenna 12, which may include an inductive element. The magnetic field induces an energizing signal for powering the tag 20 via the antenna 22, which also may include an inductive element. When powered, the tag 20 generates a signal which may include information associated with the electronic device 30 connected to the tag, an identification information for identifying the tag 20 or the electronic device 30, position information for the tag, etc. The signal is modulated and transmitted to the reader 10. The signal may be modulated using a known modulation scheme (e.g., amplitude shift keying, frequency shift keying, phase shift keying, etc.).

The tag 20 may be passive as described above or active (e.g., using an internal power source, such as a battery). An active tag may be used to provide a greater communication range between the reader 10 and the tag 20. Also, the tag system described above uses inductive coupling to communicate between the tag 20 and the reader 10, however, other known communication technologies may be used, such as RF transmission powered by an internal power source in the tag, etc.

The tag 20 is connected to the electronic device 30. The electronic device 30 may include hardware 32, an operating system 34, software applications 35, and a software module 38. The electronic device 30 may also include an interface 36 for connecting to a network and/or other electronic devices. The electronic device 30 may transmit device data associated with the electronic device 30 to the tag 20 for transmission to the reader 10. The device data may include, but is not limited to, information associated with the electronic device 30 that can be updated. The device data may include, for example, hardware configuration information for the electronic device 30, network-related information for the electronic device 30, information regarding a condition (e.g., environmental condition, such as temperature, operation status, etc.) of the electronic device 30, etc. The software module 38 may determine when device data is updated, which may include a modification, addition or deletion of device data. The software module 38 may instruct the hardware 32 to transmit a signal, including the update to the device data, to the tag 20. The tag 20 stores the device data and transmits the device data to the reader 10. The reader 10 may be connected to a monitoring station or other computing device used by a network administrator. The reader 10 may transmit the device data to the monitoring station, where the device data may be displayed to the network administrator. The tag 20 may also transmit static information to the reader 10. The static information may include identification information (e.g., identification data typically transmitted by a conventional radio frequency identification (RFID) tag).

Figure 2:
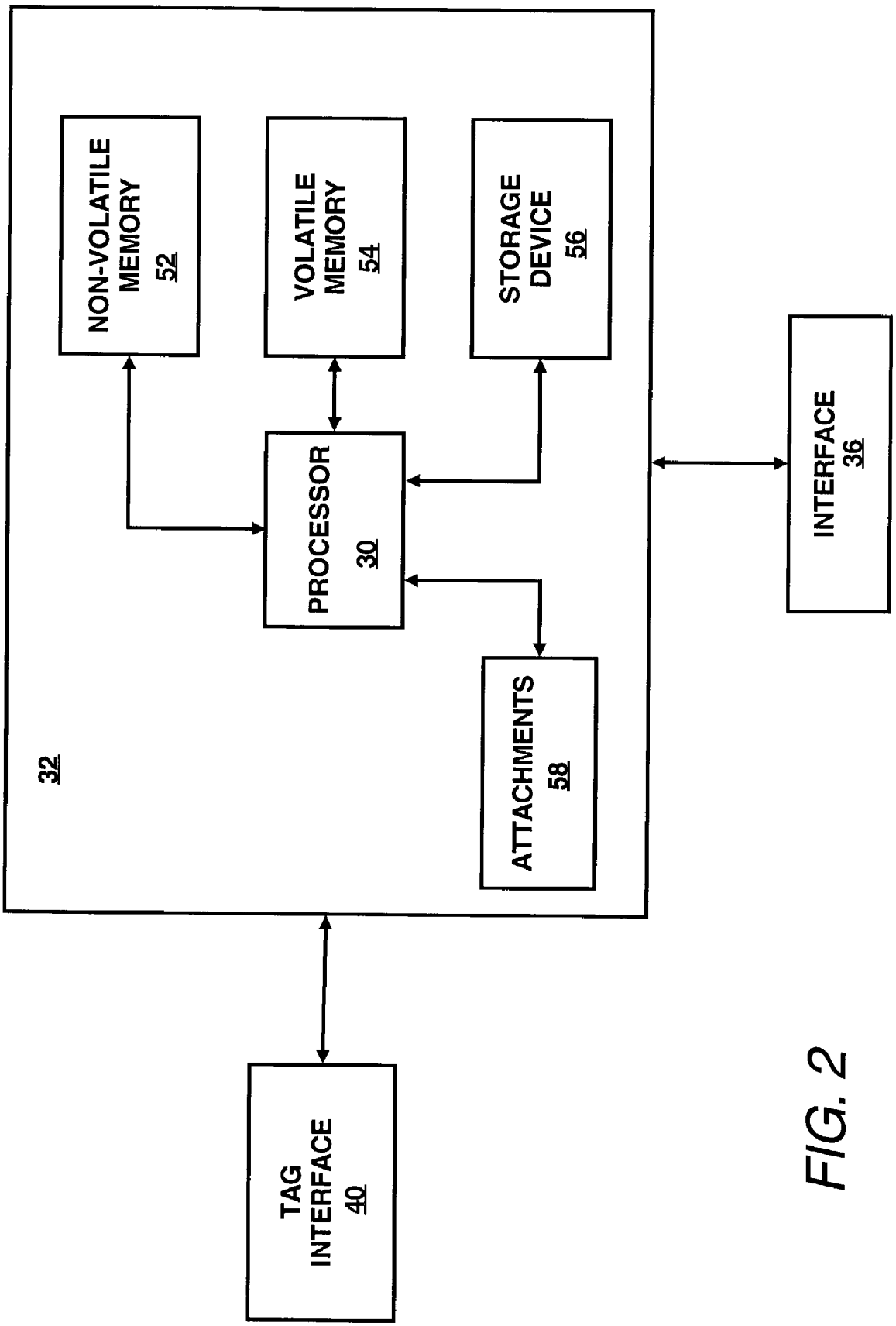
FIG. 2 illustrates a block diagram of an electronic device used in the system of FIG. 1, according to an embodiment of the invention.

FIG. 2 illustrates a block diagram of the hardware 32 for the electronic device 30. The hardware 32 may include at least one processor 50, nonvolatile memory 52 (e.g., ROM, NVRAM, etc.), volatile memory 54 (RAM, etc.), and optional storage device 56 (e.g., hard drive(s), micro-electro-mechanical system (MEMS), etc.). Electronic devices, such as servers, personal computers, etc., generally include storage devices, but some network switches may not. The hardware 32 optionally includes attachments 58, such as cards (network cards, video cards, etc.) that are connected to the electronic device 30 via, for example, slots, CD-ROM, DVD drive, floppy, drive, keyboard, mouse, etc. The software module 38 and the device data may reside in the nonvolatile memory 52 or the storage device 56. The software module 38 executes instructions on the processor 50 for detecting updates to the device data, and transmits updates to the device data to the tag 20 via a tag interface 40. The tag interface 40 may include a wired or wireless connection between the electronic device 30 and the tag 20. The interface 40 may include the same communication interface the tag uses to communicate with the reader 10.

According to an embodiment of the invention, the electronic device 30 may be connected to a network. The device data associated with the electronic device 30 may include information also associated with a network, such as Internet Protocol (IP) address assigned to the electronic device 30, one or more media access control (MAC) addresses assigned to the electronic device 30, firewall information, etc.

The device data may include information related to the hardware 32 in the electronic device 30 (which can also be related to the information associated with the network), such as connection status of the attachments 58 (e.g., keyboard, mouse, cards, CD-ROM, DVD, etc.) and the storage devices 56.

The device data may include information associated with conditions for the electronic device 30, such as state of the hardware 32. State of the hardware 32, for example, may include state of a watchdog timer for the processor 50, operational status of ports, state of connectivity to the network, etc. Sensors (not shown) may be used to detect environmental conditions of the electronic device 30, such as temperature of the processor 50. A detected update may include a detected temperature reaching a predetermined threshold, a failure of any of the hardware 32, loss of connectivity to the network, change in IP address and/or MAC address, etc. It should be noted that the device data is not limited to the embodiments described above and may include any data associated with the electronic device.

According to an embodiment of the invention, the software module 38 may use information from a basic input/output system (BIOS) 33 (shown in FIG. 1) of the electronic device 30 to identify device data and to perform updates to the device data. The BIOS 33 is a program that is made accessible to the processor 50 on the nonvolatile memory 52, such as an electronically erasable programmable read-only memory (EEPROM), and the like. When the electronic device 30 is turned on, the processor 50 passes control to the BIOS 33. The BIOS 33 determines the hardware configuration and hardware status information of the electronic device 30, and then the BIOS 33 loads the operating system 34 (or key parts of it). The hardware configuration information may include connection status of the attachments 58 (e.g., keyboard, mouse, cards, CD-ROM, DVD, etc.) and the storage devices 56, MAC addresses for attachments, etc. The BIOS 33 may identify whether a processor 56 is active. The processor 56 may include one or more processors, and status information for each processor is available. This and other information are available from the nonvolatile memory 52 where the BIOS 33 resides.

The software module 38 may retrieve the hardware configuration and status information from the nonvolatile memory 52 to detect updates to this information. The software module 38 may access one or more files to identify other information associated with the electronic device 30. Network information, such as IP address, and the like, is typically stored by electronic devices, such as servers, personal computers, etc., in a file. If the OS 34 comprises a WINDOWS OS, a WINIP configuration file stores the network information. The software module 38 may access this file to retrieve the network information for the electronic device 30.

Information, such as from environmental sensors detecting temperature and other conditions, may also be retrieved from the storage device 56 or memories 52 and 54, depending on where the information is stored. Data from the sensors may be transmitted to the tag 20. In one embodiment, the data from the sensors is compared to a threshold by the software module 38. If, for example, a sensed condition is greater than the threshold, the software module 38 may initiate transmission of a notification and/or the data to the tag 20.

After the device data is identified by the software module 38, the software module 38 may compare the identified device data with stored device data previously identified. Any differences are considered to be updates to the device data. The updates are transmitted to the tag 20. Because, memory in the tag 20 may be limited, the updates transmitted to the tag 20 may include the differences between the stored and newly identified device data. If enough memory in the tag 20 is available, the updates may include some or all of the device data. The electronic device 30 may store updates for the device data in high speed memory (e.g., RAM, NVRAM, etc), such that the device data is readily accessible in response to a query for the updates from the tag 20.

Figure 3:
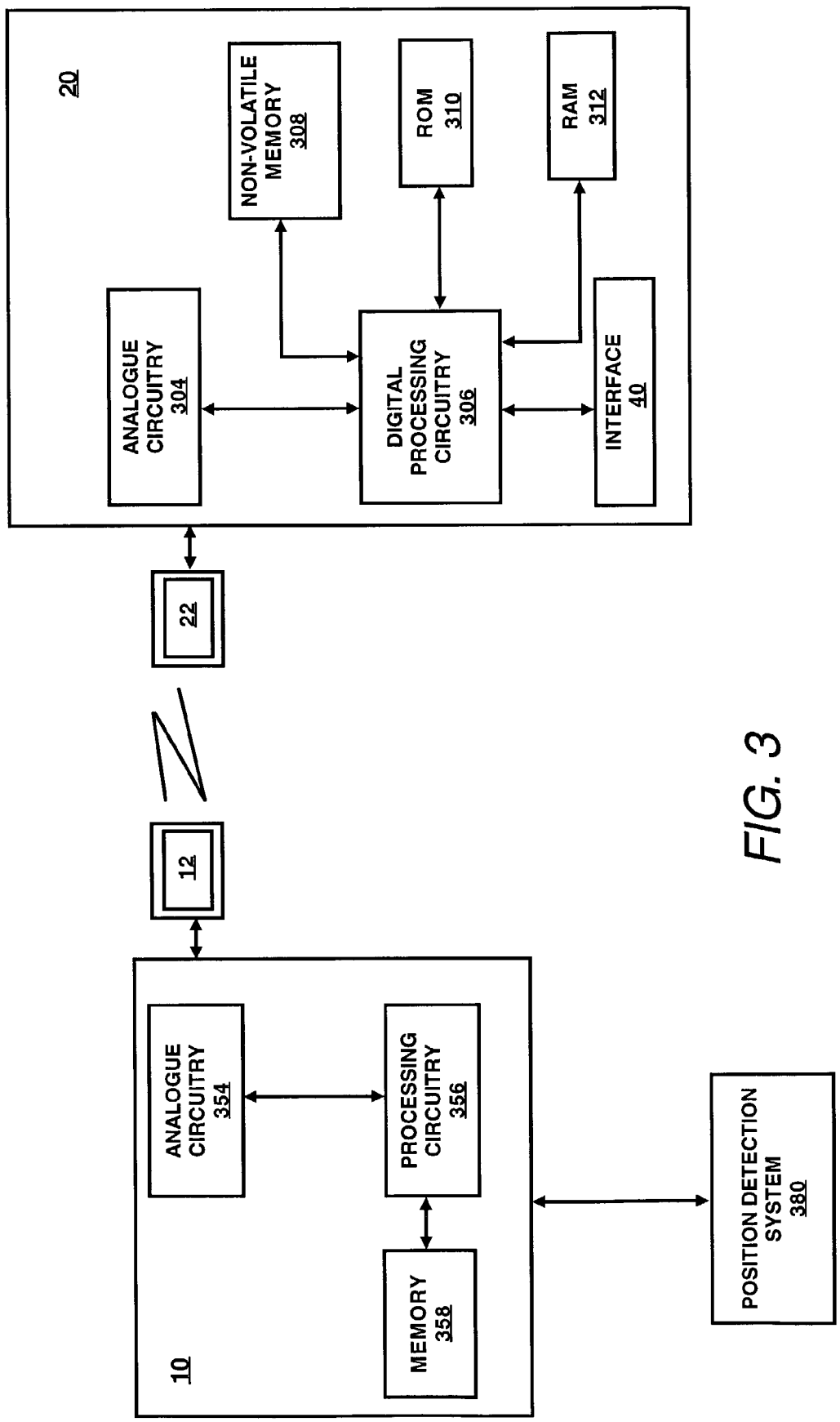
FIG. 3 illustrates a block diagram of a tag and a reader, according to an embodiment of the invention.

FIG. 3 illustrates detailed block diagrams of the reader 10 and the tag 20. The tag 20 includes an antenna 22, analogue circuitry 304, digital processing circuitry 306, nonvolatile memory 308, read only memory (ROM) 310, and random access memory (RAM) 312. The analogue circuitry 304 may include modulation circuitry for receiving and transmitting information to the reader 10 and power generation circuitry. For example, the tag 20 may receive an interrogation signal from the reader 10 via the antenna 22 and generate power (e.g., via a coil in a magnetic field) from the interrogation signal. Optionally a power supply may be provided for an active tag.

The ROM 310 may accommodate security data and the operating system instructions which, in conjunction with the digital processing circuitry 306, perform the internal "housekeeping" functions, such as response delay timing, data flow control and power supply switching. The RAM 312 may facilitate temporary data storage during transponder interrogation and response times. Also, the RAM 312 may store device data received from the electronic device 30 of FIGS. 1A-B. The non-volatile memory 308 may take various forms, electrically erasable programmable read only memory (EEPROM) being typical. The non-volatile memory 308 is used to store the transponder data (e.g., identification data) and the data is retained in the non-volatile memory 308 even when the device is in its quiescent or power-saving "sleep" state.

The tag 20 may be active (i.e., includes an internal power supply). Therefore, the device data may be transmitted anytime to the reader 10. If the tag 20 is passive, then substantially immediately after receiving an interrogation signal, the tag 20 requests device data from the electronic device 30. The device data is received and stored in the RAM 312 and transmitted to the reader 10. The digital processing circuitry 306 generates a signal for transmission, which is modulated using the analogue circuitry 304 and the antenna 22. For a passive tag, the electronic device 30 may store the device data in high-speed memory (e.g., RAM, NVRAM, etc.), such that the device data may be readily accessed and transmitted to the tag 20 substantially immediately after receiving a request from the tag 20.

The reader 10 includes an antenna 12, analogue circuitry 354, digital processing circuitry 356, and a memory 358. The analogue circuitry 354 may include modulation circuitry for receiving and transmitting information to the tag 20. The tag 20 may be active (i.e., including an internal power supply). The digital processing circuitry 356 may generate an interrogation signal (e.g., if the tag 20 is passive), which is modulated using the analogue circuitry 354 and the antenna 12. The processing circuitry 356 may receive device data from the tag 20 and store the device data in the memory 358. The memory 358 may include one or more of RAM, ROM, EEPROM, etc. The memory 358 may also store an operating system and/or firmware. The reader 10 may be connected to another computing device or a network, such that the device data may be downloaded. It should be noted that the reader 10 and the tag 20 may include other components not shown and known in the art.

The reader 10 may also be connected to a position detection system 380, such as described in corresponding U.S. Pat. No. 6,796,506, entitled, "Tracking Electronic Devices by Pradhan at al. and U.S. patent application Ser. No. 10/383,652, entitled "Tracking Electronic Devices by Pradhan et al., both of which are herein incorporated by reference in their entireties. The position detection system 380 determines the presence and location of multiple electronic devices housed, for example, in one or more racks in a data center. The position detection system 380 may transmit location information and corresponding device data for each electronic device used in a system to a network monitoring station for storage in a database. Also, the position detection system 380 may store location information and corresponding device data locally, and transmit the location information and corresponding device data to other systems and devices when requested.

Figure 4:
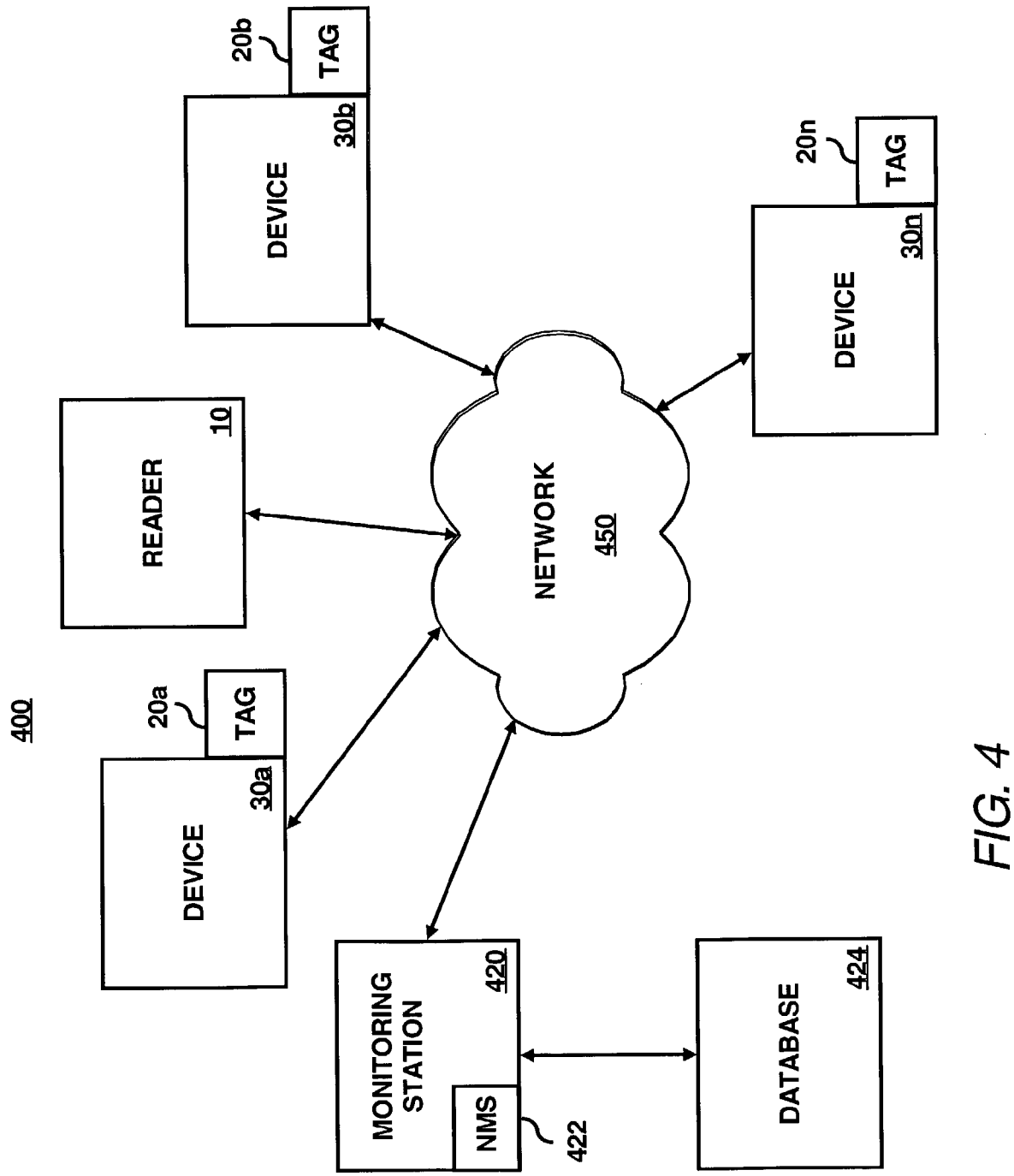
FIG. 4 illustrates a block diagram of a network system, according to an embodiment of the invention.

As described above, the electronic device 30 may be connected to a network. FIG. 4 illustrates a system 400 comprising electronic devices 30a . . . n connected to one or more networks 450, according to an embodiment of the invention. Each of the electronic devices 30a . . . n are connected to corresponding tags 20a . . . n. The reader 10 is used to interrogate one or more of the tags 20a . . . n for identification information (e.g., unique identification codes) and device data associated with corresponding electronic devices 30a . . . n. The reader 10 may be connected to a monitoring station 420 which receives and stores information from the reader 10 in for example, the database 424. The monitoring station 420 may display the information from the reader, for example, via network management software (NMS) 422. For example, a network administrator may use the NMS 422 to display device data, such as IP address, hardware configuration, etc. The NMS 422 may include Hewlett-Packard's OpenView™ or the like.

The reader 10 may be connected to the monitoring station via the network 450 or directly connected to the monitoring station 420. FIG. 4 illustrates one reader 10, however, multiple readers may be utilized to interrogate the tags 20a . . . n for information. Each reader may be connected to a position detection system, such as shown in FIG. 3, for determining location of the electronic devices 30a . . . n. The database 424 may also store location information along with correspond device data for the electronic devices 30a . . . n. Thus, the NMS 422 may access the database 424 for analyzing and displaying device data and location information for troubleshooting and maintenance of the network 450 and electronic devices 30a . . . n.

Figure 5A:
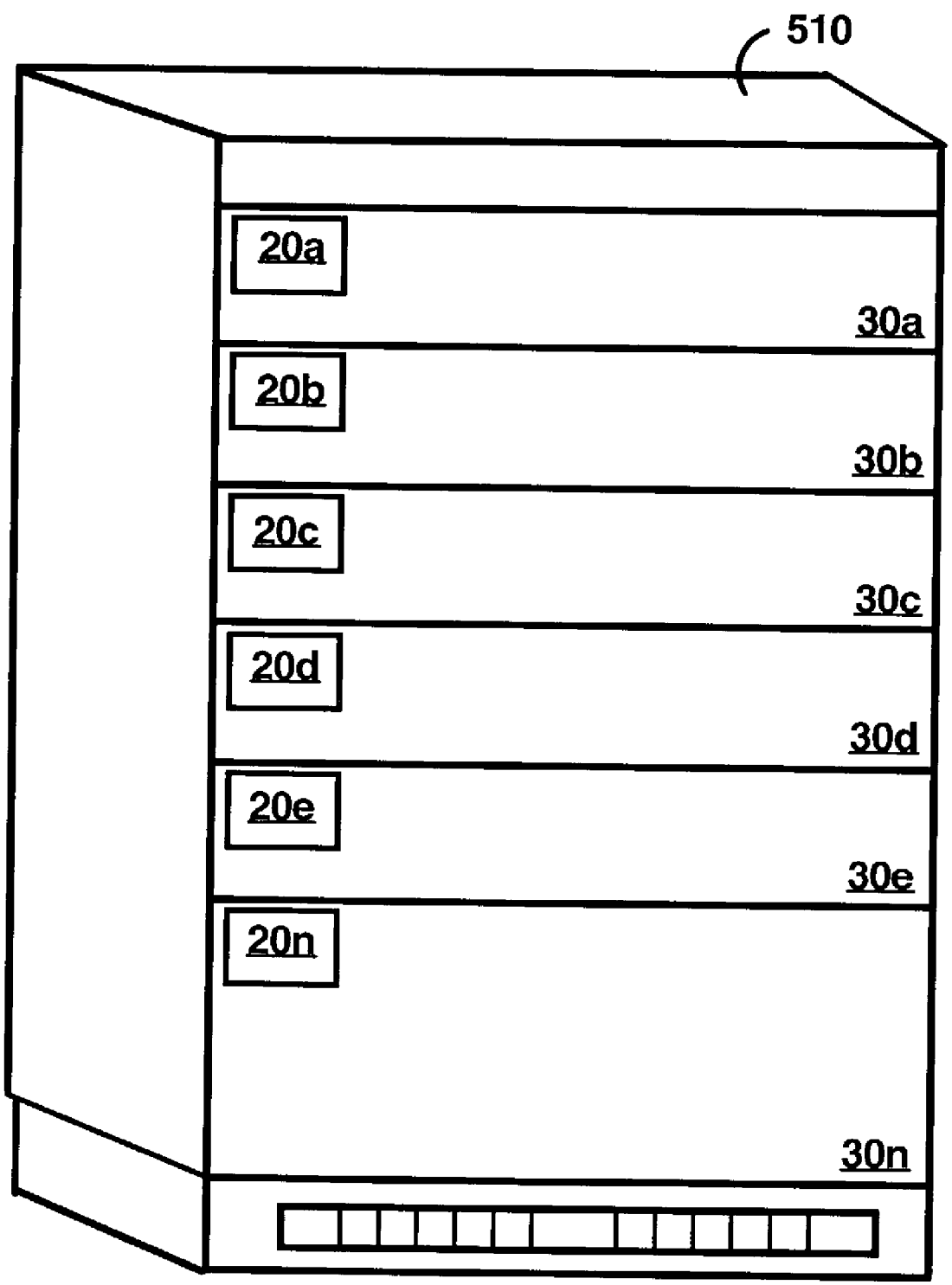
FIG. 5A illustrates a rack, according to an embodiment of the invention.

According to an embodiment of the invention, the electronic devices 30a . . . n may be provided in one or more racks in a data center. FIG. 5A illustrates a rack 510, which may be used in a data center (not shown) for housing electronic devices 30a . . . n, according to an embodiment of the invention. The rack 510 may be a rack unit for housing multiple electronic devices. The rack 510, for example, may include a standard 42 unit rack, 46 unit rack, etc. The rack 510 includes shelves (not shown) supporting the electronic devices 30a-n. The electronic devices 30a-n may be network devices connected to the network 450 of FIG. 2 or devices used with network devices (e.g., servers, routers, hubs, monitors, power supplies, client devices such as personal computers, personal digital assistants, etc.). The tags 20a-n are connected to corresponding electronic devices 30a-f. As described above, each of the tags 20a-n may receive device data from corresponding electronic devices 30a-n and transmit the device data to one or more readers, such as the reader 10 of FIG. 1. Identification information may also be transmitted from the tags 20a-n to one or more readers.

Figure 5B:
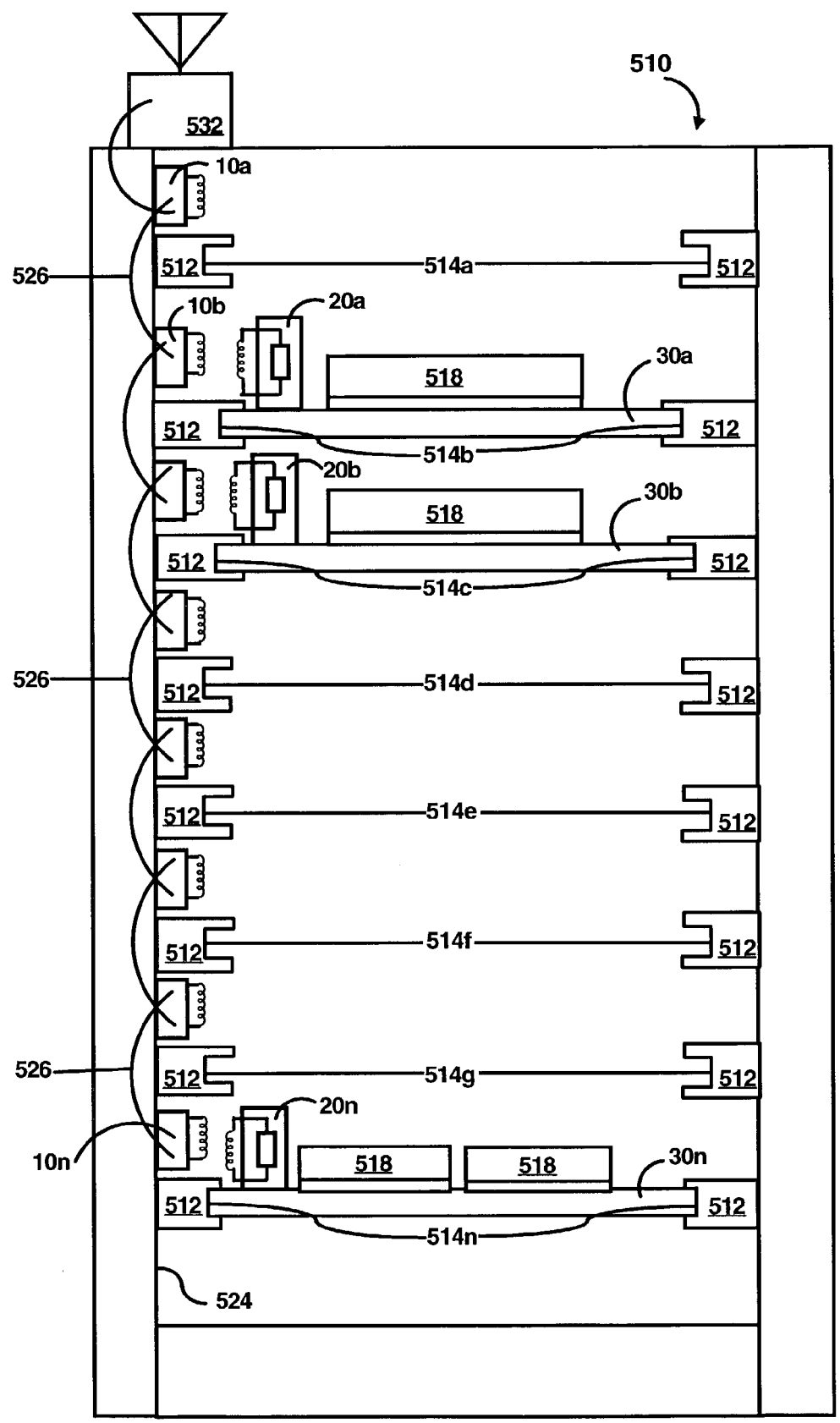
FIG. 5B illustrates a position detection system, according to an embodiment of the invention.

In addition to device data and identification information, location information may be determined for each electronic device using, for example, the position detection system 380 of FIG. 3. FIG. 5B illustrates an embodiment of the position detection system 380 that may be used to collect device data and determine location of electronic devices in a rack, such as described in corresponding U.S. Pat. No. 6,796,506, incorporated by reference.

Referring to FIG. 5B, the rack 510 includes opposed pairs of mounts 512 that define open bays 514a-n into which electronic devices 30a . . . n are located. The term "rack" includes any doors, lids, or other accessories associated with the rack (not shown). It should be noted that the mounts 512 and bays 514a-n merely exemplify one of any number of mounting means that are used with rack apparatus. Furthermore, the term "bay" is synonymous with slot, opening, location, position, and the like. The rack 510 may house any number of electronic devices 30a . . . n which may be modules, server boards, telecommunications devices, and the like, e.g., about forty (40) to eighty (80) devices. The electronic devices 30a . . . n typically include a number of components and/or attachments 518, e.g., processors, micro-controllers, high speed video cards, memories, semi-conductor devices, and the like.

Each electronic device 30a . . . n is tagged with a tracking device or tag 20a . . . n, such as a radio frequency (RF) transponder, or RF tag, as shown. Alternatively, each tag 20 may instead be a bar code tag, a magnetic tag, and the like. The tags 20a . . . n are shown mounted onto a left front portion of each corresponding electronic device 30a . . . n, but the tags 20a . . . n can be mounted to, printed on, or encapsulated within the electronic devices 30a . . . n.

Located just above each pair of mounts 512 the rack 510 includes reading devices or readers 10a . . . n, such as RF transponders, bar code scanners, magnetic pickups, and the like. As shown, the readers 10a . . . n are mounted to a front portion of a left inside wall 524 of the rack 510 and are distributed so as to align with the left front mounting schema of the tags 20a . . . n. The location of each reader 10a . . . n may be, e.g., manually associated with its respective bay and rack location and entered into computer memory. One of ordinary skill in the art will recognize that the readers 10a . . . n may be mounted to the rack 510 in any reasonable manner including any of a variety of fastening devices including tie straps, hook and loop material, screws, mounting brackets, and the like (not shown). The readers 10a . . . n and tags 20a . . . n may be mounted in any corresponding locations, positions, or orientations on the rack 510 to ensure that each tag 20a . . . n, no matter where located in or on the electronic devices 30a . . . n, aligns with a corresponding reader 10a . . . n when the electronic devices 30a . . . n are docked to the rack 510. Accordingly, the readers 10a . . . n may alternatively be mounted to a rear portion of the inside wall 524 of the rack 510, to a door (not shown) of the rack, on the mounts 512, and the like. As shown, the readers 10a . . . n are daisy chained together in series. For example, the output of reader 10a is connected to an input of reader 10b via a connector 526. Alternatively, the readers 10a . . . n may be connected by a connector, in parallel, such that each reader 10a . . . n can be addressed independently, or may be connected in any other reasonable manner. The location of each reader 10a . . . n may be designated by its corresponding rack 510 and bay 514.

The tags 20a . . . n may store unique identification codes and device data, such as described herein. The tags 20a . . . n may transmit the identification codes and device data to corresponding readers 10a . . . n. In one embodiment, a node 532 activates each reader 10a . . . n to interrogate each tag 20a . . . n for the identification codes and device data. The node 532 may include a computing device with a transceiver for communicating with other nodes. The readers 10 . . . n decode the identification codes and device data and transmit the data to the node 532 mounted, for example, atop the rack 510. The node 532 may store the location of each reader 10a . . . n in the rack 510. Thus, the node 532 can correlate the presence of information received from one of the tags 20a . . . n with a known location to determine location of one of the electronic devices 30a . . . n connected to the tag. The node 532 may transmit location information and device data to the monitoring station 422 and database 424 of FIG. 4 and/or to other nodes (not shown). The location information may include location of electronic devices within a rack and a location of the rack.

Figure 5C:
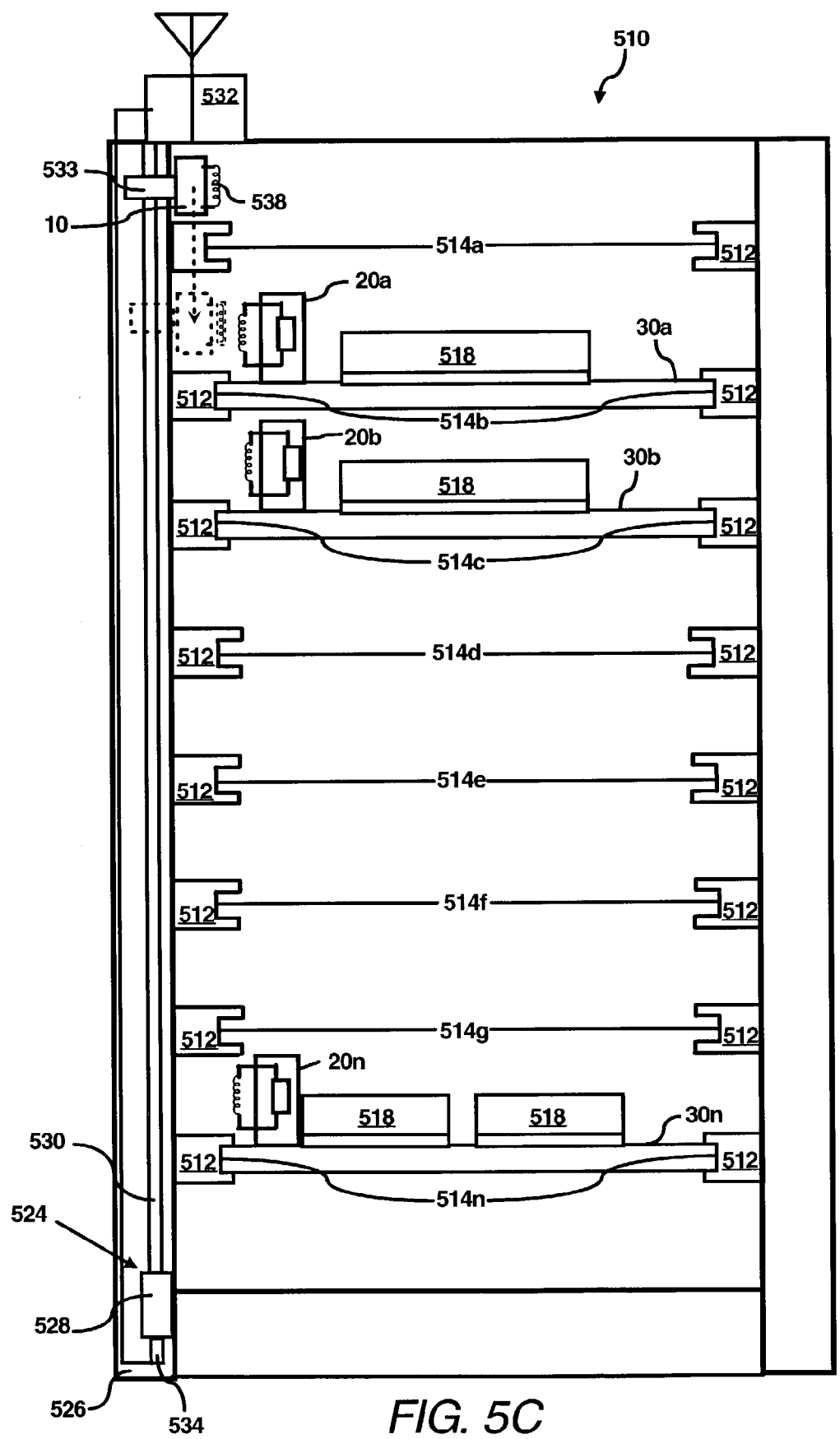
FIG. 5C illustrates a position detection system, according to another embodiment of the invention.

FIG. 5C illustrates yet another embodiment of the position detection system 380 of FIG. 3 that may be used to collect device data and determine location of electronic devices in a rack, such as described in corresponding U.S. patent application Ser. No. 10/383,652, incorporated by reference. The embodiment of FIG. 5C includes many of the features of the embodiment of FIG. 5B, except a reader 10 moves to predetermined locations at the bays 514a . . . n to read identification codes and device data from the tags 20a . . . n. The reader 10 transmits the identification codes and the device data to the node 532, and the node 532 determines location information for the electronic devices 30a . . . n.

The reader 10 is rendered traversable by a traversing mechanism 524 that is mounted, for example, to a front face 526 of the rack 510. Other mounting locations, including the back, the sides, a door (not shown), and the like, may instead be used. The traversing mechanism 524 is mounted to ensure that reader 10 traverses proximate the tags 20a . . . n so as to function within their predetermined transmission range.

The traversing mechanism 524 includes a motor 528, a threaded rod 530 that is rotated by the motor 528, and a threaded collar 533 that is linked to the threaded rod 530. As such, the powered screw device converts rotation of the motor 528 into longitudinal translation of the threaded collar 533 and the reader 10. The reader 10 is mounted to the threaded collar 533 in any reasonable manner including brackets and fasteners, tie straps, adhesive, and the like. A position encoder 534 is attached to or integrated with the motor 528 to sense the angular position of the threaded rod 530 from which the relative longitudinal position of the threaded collar 532 and the reader 10 can be determined.

Figure 6:
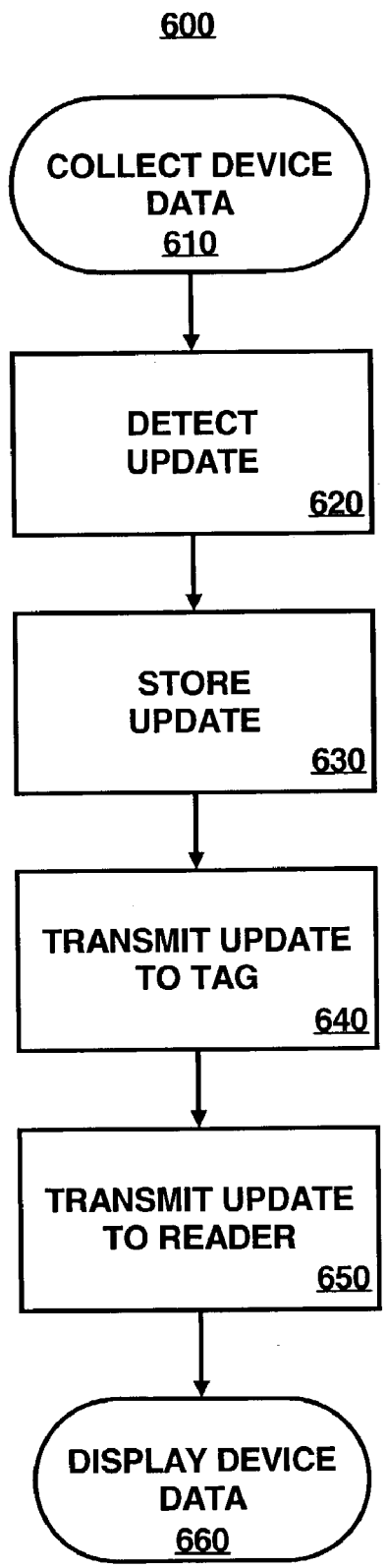
FIG. 6 is a flow chart of a method, according to an embodiment of the invention.
Figure 7:
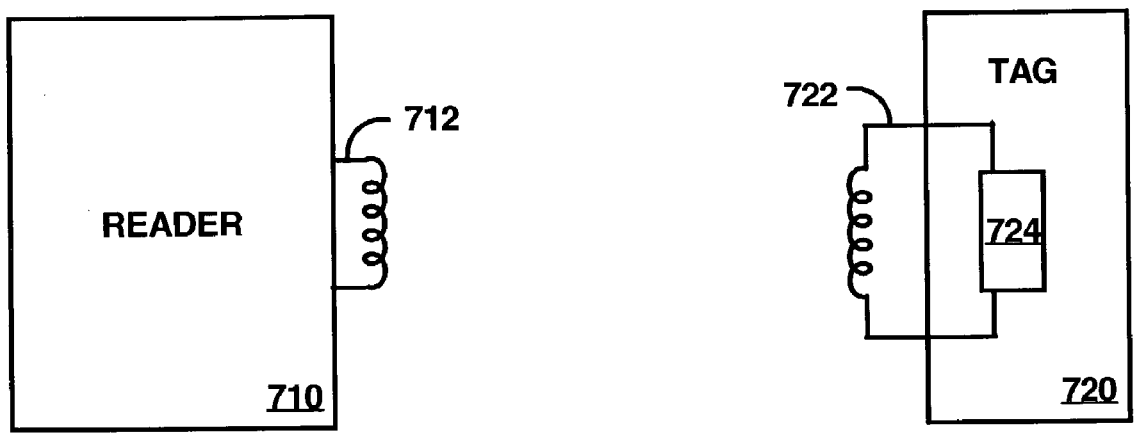
FIG. 7 illustrates a conventional reader and tag.

FIG. 6 illustrates a method 600, according to an embodiment of the invention. In step 610, the electronic device 30 of FIG. 1 collects and stores device data. In step 620, the electronic device 30 detects an update to the device data. For example, the electronic device 30 detects a change to the device data by comparing newly identified device data to stored device data. In step 630, the update to the device data is stored. In step 640, the electronic device 30 transmits the update to the tag 20, where it is stored. In step 650, the tag 20 transmits the update to the reader 10, for example, in response to receiving an interrogation signal. The reader 10 may be connected to monitoring station having an NMS. In step 660, the device data and/or the update to the device data is displayed using, for example, the NMS. The reader 10 may be connected to a position detection system for determining location of the electronic device 30. The location information may also be transmitted to a monitoring station and database. Furthermore, in step 640 some or all of the device data may be transmitted to the tag 20 rather than only the update to the device data, such that the device data may eventually be stored in a location that is accessible by other devices.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. An apparatus comprising:
   a processor operable to collect device data associated with the apparatus; and
   a storage medium connected to the processor and operable to store the device data, wherein the processor transmits at least some of the device data to a tag which stores the received at least some of the device data, and wherein the tag is a transponder operable to be read by a tag render to receive the at least some device data from the tag.

2. The apparatus of claim 1, further comprising software initiating transmission of the device data to the tag in response to detecting an update to the device data.

3. The apparatus of claim 2, wherein an update to the device data comprise one or more of a modification to the device data, an addition of information to the device data, and a deletion of information from the device data.

4. The apparatus of claim 1, wherein the device data comprises information associated with hardware for the apparatus.

5. The apparatus of claim 1, wherein the apparatus is connected to a network, and the device data includes information about the network.

6. The apparatus of claim 1, wherein the device data includes an environmental condition of the apparatus.

7. A system comprising:
   an electronic device connected to a network; and
   a tag connected to the electronic device, wherein the electronic device is operable to transmit data to the tag in response to detecting a condition of the electronic device, and wherein the tag is a transponder operable to be read by a reader to receive the data transmitted to the tag.

8. The system of claim 7, wherein the data includes information about the electronic device and the network.

9. The system of claim 8, wherein the electronic device stores the data, and the condition comprises an update to the stored data.

10. The system of claim 7, wherein the condition comprises a change of a hardware configuration of the electronic device.

11. The system of claim 7, wherein the condition comprises a detected environmental condition of the electronic device.

12. The system of claim 7, further comprising the reader, wherein the tag transmits the data to the reader in response to being interrogated by the reader.

13. The system of claim 12, further comprising a computing device connected to the reader, the computing device including network management software for monitoring the network and being operable to receive the data from the reader for display by the network management software.

14. The system of claim 7, wherein the electronic device is housed in a rack.

15. A method comprising:
   storing data associated with an electronic device;
   detecting an update of the data; and
   transmitting the updated data from the electronic device to a tag in response to detecting the update, wherein the tag is a transponder operable to be read by a reader to receive the updated data.

16. The method of claim 15, further comprising:
   storing the updated data in the tag;
   receiving an interrogation signal from the reader; and
   transmitting the updated data from the tag to the reader in response to receiving the interrogation signal.

17. The method of claim 16, wherein the electronic device is connected to a network, and the updated data includes information about the network, and the method further comprises transmitting the updated data from the reader to a computing device having network administration software.

18. The method of claim 17, further comprising displaying the updated data using the network administration software.

19. The method of claim 15, wherein the updated data comprises information about one or more detected environmental conditions of the electronic device and the step of detecting an update comprises detecting a changed environmental condition of the electronic device from the updated data.

20. The method of claim 15, wherein the updated data comprises information about hardware for the electronic device and the step of detecting an update comprises detecting a change to the hardware from the updated data.

21. The method of claim 15, wherein the updated data comprises information about the electronic device and a network, the electronic device being connected to the network, and the step of detecting an update comprises detecting a change to the data.

22. An apparatus comprising:
   means for storing data associated with an electronic device;
   means for detecting an update of the data; and
   means for transmitting the updated data from the electronic device to a tag, wherein the tag is a transponder operable to be read by a reader to receive the updated data.

23. The apparatus of claim 22, wherein the tag comprises:
   means for storing the updated data;
   means for receiving an interrogation signal from the reader; and
   means for transmitting the updated data to the reader means in response to receiving the interrogation signal.

24. The apparatus of claim 22, further comprising a computing device means for monitoring a network using network management software, wherein the computing device means is operable to receive the updated data from the reader and display the updated data using the network management software.

25. The apparatus of claim 22, wherein the update to the data comprises one or more of a an update of data associated with a hardware configuration of the electronic device, an update of data associated with an environmental condition of the electronic device, and an update of data associated with a network, wherein the electronic device is connected to the network.

26. A system comprising:
   a plurality of electronic devices connected to a network;
   a tag connected to each electronic device, wherein each electronic device is operable to transmit data associated with the electronic device to the tag, wherein the tag is a transponder operable to be read by at least one reader to receive the data from the tag; and
   a computing device including network management software, wherein the computing device is operable to receive the data associated with each electronic device and display the data using the network management software.

27. The system of claim 26, wherein the data associated with each electronic device comprises an update to previously stored data for the respective electronic device.

28. The system of claim 26, further comprising the at least one reader which reads the data from each tag for transmission to a storage device for use by the network management software.

29. The system of claim 26, further comprising a position detection system connected to the tags and being operable to determine a location of each electronic device.

30. The system of claim 29, wherein the location of each electronic device is one or more of location within a rack housing the respective electronic device and location of a rack housing the respective electronic device.

31. The system of claim 26, wherein the data includes information about the network.

32. The system of claim 26, wherein the computing device is connected to a database storing the data associated with each electronic device.

33. A system comprising:
   at least one electronic device housed in a rack;
   a tag connected to the at least one electronic device, wherein the electronic device is operable to transmit data associated with the electronic device to the tag;
   at least one reader operable to receive the data associated with the electronic device from the tag; and
   a computing device connected to the at least one reader, the computing device being operable to determine location of the electronic device based on detecting a presence of the electronic device in the rack.

34. The system of claim 33, wherein the presence of the electronic device in the rack is determined based on whether data is received from the tag.

35. The system of claim 33, wherein the location comprises one or more of location within the rack and location of the rack.

* * * * *

UNITED STATES PATENT AND TRADEMARK OFFICE
CERTIFICATE OF CORRECTION

| | | |
|---|---|---|
| PATENT NO. | : 7,873,723 B2 | Page 1 of 1 |
| APPLICATION NO. | : 10/354109 | |
| DATED | : January 18, 2011 | |
| INVENTOR(S) | : Geoff M. Lyon et al. | |

It is certified that error appears in the above-identified patent and that said Letters Patent is hereby corrected as shown below:

In column 9, line 9, in Claim 1, delete "render" and insert -- reader --, therefor.

In column 9, line 15, in Claim 3, delete "comprise" and insert -- comprises --, therefor.

In column 10, line 40, in Claim 25, delete "a an" and insert -- an --, therefor.

Signed and Sealed this
Twenty-fourth Day of April, 2012

David J. Kappos
*Director of the United States Patent and Trademark Office*